United States Patent
Schechter

(10) Patent No.: US 11,531,611 B2
(45) Date of Patent: Dec. 20, 2022

(54) AUDITING-AS-A-SERVICE

(71) Applicant: NCR Corporation, Atlanta, GA (US)

(72) Inventor: Michael Schechter, Lake Mary, FL (US)

(73) Assignee: NCR Corporation, Atlanta, GA (US)

(*) Notice: Subject to any disclaimer, the term of this patent is extended or adjusted under 35 U.S.C. 154(b) by 0 days.

(21) Appl. No.: 16/524,511

(22) Filed: Jul. 29, 2019

(65) Prior Publication Data
US 2021/0034496 A1 Feb. 4, 2021

(51) Int. Cl.
G06F 11/34 (2006.01)

(52) U.S. Cl.
CPC ...... *G06F 11/3476* (2013.01); *G06F 11/3404* (2013.01); *G06F 11/3471* (2013.01)

(58) Field of Classification Search
CPC ............. G06F 11/3476; G06F 11/3471; G06F 11/3404
See application file for complete search history.

(56) References Cited

U.S. PATENT DOCUMENTS

| | | | | |
|---|---|---|---|---|
| 7,496,869 B1 * | 2/2009 | Janneck | .................. | G06F 30/30 716/103 |
| 10,713,664 B1 * | 7/2020 | Alagappan | ........... | G06Q 30/018 |
| 2001/0048728 A1 * | 12/2001 | Peng | ........................ | H04L 41/00 375/354 |
| 2003/0237046 A1 * | 12/2003 | Parker | .................. | G06F 40/166 715/234 |
| 2004/0268399 A1 * | 12/2004 | Asakawa | ......... | H04N 21/23418 386/E5.001 |
| 2005/0044295 A1 * | 2/2005 | Wakeam | ............... | G06F 40/171 710/72 |
| 2009/0055737 A1 * | 2/2009 | Borchardt | ............. | G06F 40/169 715/708 |
| 2009/0080658 A1 * | 3/2009 | Waters | .................. | H04L 9/3073 380/277 |
| 2010/0005455 A1 * | 1/2010 | Gyure | ................. | G06F 11/3636 717/128 |

(Continued)

FOREIGN PATENT DOCUMENTS

CN 105278929 A * 1/2016

OTHER PUBLICATIONS

Henze et al., "The Cloud Needs Cross-Layer Data Handling Annotations", 2013, IEEE (Year: 2013).*

(Continued)

*Primary Examiner* — Wei Y Zhen
*Assistant Examiner* — Junchun Wu
(74) *Attorney, Agent, or Firm* — Schwegman, Lundberg & Woessner

(57) ABSTRACT

Auditing information is captured from a processing stack of an invoked application. An annotation customized for that invocation context is processed to filter and/or add additional audition information available from the processing stack. The customized auditing information is then sent to a destination based on a processing context of the invoked application when the invoked application completes processing. In an embodiment, the customized auditing information is housed in a data store and an interface is provided for customized query processing, report processing, event processing, a notification processing.

19 Claims, 4 Drawing Sheets

(56) References Cited

U.S. PATENT DOCUMENTS

| | | | |
|---|---|---|---|
| 2010/0122154 A1* | 5/2010 | Howell | G06F 40/169 715/233 |
| 2010/0325727 A1* | 12/2010 | Neystadt | G06F 21/53 726/22 |
| 2012/0030251 A1* | 2/2012 | Alfredson | G06Q 10/103 707/E17.005 |
| 2012/0254838 A1* | 10/2012 | Luo | G06F 11/3476 717/128 |
| 2012/0259746 A1* | 10/2012 | Groom | G06Q 10/00 705/30 |
| 2013/0074050 A1* | 3/2013 | Masser | G06F 11/3476 717/128 |
| 2013/0269028 A1* | 10/2013 | Nakawatase | H04L 63/1433 726/22 |
| 2014/0223416 A1* | 8/2014 | Cohen | G06F 17/40 717/123 |
| 2015/0013000 A1* | 1/2015 | Linnakangas | H04L 63/08 726/14 |
| 2015/0030313 A1* | 1/2015 | Tammisalo | G06F 16/30 386/278 |
| 2015/0058825 A1* | 2/2015 | Madam | G06F 11/3082 717/128 |
| 2016/0048529 A1* | 2/2016 | Mathur | G06F 11/3476 707/662 |
| 2016/0147840 A1* | 5/2016 | Boguraev | G06F 3/0481 707/731 |
| 2016/0191351 A1* | 6/2016 | Smith | H04L 67/10 709/219 |
| 2019/0334789 A1* | 10/2019 | Roche | G06N 20/00 |
| 2019/0370264 A1* | 12/2019 | Wang | G06Q 10/06 |
| 2020/0159624 A1* | 5/2020 | Malkov | G06N 20/00 |
| 2020/0183913 A1* | 6/2020 | Murphy | G06F 11/302 |
| 2021/0034496 A1* | 2/2021 | Schechter | G06F 11/3404 |

OTHER PUBLICATIONS

Madi et al., "ISOTOP: Auditing Virtual Networks Isolation Across Cloud Layers in OpenStack", Oct. 2018, ACM, vol. 22, No. 1, Article 1. (Year: 2018).*

Lo et al., "Cost-Sensitive Stacking for Audio Tag Annotation and Retrieval", 2011, IEEE (Year: 2011).*

Dulhanty et al., "Auditing ImageNet: Towards a Model-driven Framework for Annotating Demographic Attributes of Large-Scale Image Datasets", Jun. 2019, arXiv.org (Year: 2019).*

* cited by examiner

AUDITING-AS-A-SERVICE

BACKGROUND

Enterprises want to focus their limited resources on their core knowledge base to maintain expertise that is directed to their business activities. Every enterprise whether technology-based, food-based, lodging-based, entertainment-based, product-based, etc. requires software services to continue ongoing operations of that enterprise. Because of this, a variety of third-party service providers offer customizable cloud-based software services that can provide the software services needed by the wide-array of enterprise types.

Technology outsourcing has numerous benefits to the enterprise because technology staff can be limited within the enterprise, such that there is no need for large software development groups that would otherwise be necessary to support services/products of the enterprise. Additionally, the hardware assets necessary to deliver the software services can be eliminated, since many third-party providers make those software services available through cloud servers maintained by the third-party providers.

However, because many enterprises need service customizations and have different data auditing requirements (which are dynamic and continuously changing based on government regulations, industry standards, and internal enterprise needs), enterprises must forego robust auditing data. Desired features, data knowledge, and technology support are all dependent on the underlying data captured and produced by the software services. The enterprise does not control or support the services, and changes to these services require change orders with the third-party suppliers that can be costly and take an unacceptable amount of time before such data features are capable of being delivered to the enterprise.

Furthermore, the third-party providers struggle with tech support because the necessary data capture from the services is not captured in existing auditing data. Customizing changes for all the impacted services is not cost effective for the third-party providers, especially when a single service may be critical to operations of multiple different enterprises; such that, any mistakes made in changing the services can have a significant business impact on the enterprises and correspondingly the third-party providers. But the lack of necessary data structure and data capture impact service response times from the third-party providers when the enterprises encounter service data quality issues, poor service performance response times, and service availability issues.

The above-mentioned problems become even more pronounced when enterprises include out-sourced services that span multiple different communication channels (mobile, web, voice, terminal-based, etc.). Often auditing data is lost during cross-channel service processing, which exacerbates the issue.

SUMMARY

In various embodiments, methods and a system for Auditing-as-a-Service (AaaS) are presented.

According to one aspect presented herein, a method for AaaS is presented. The microservice that intends to capture data annotates the relevant invocation endpoints with metadata that describes what data is to be captured, and what format it is to be reported in. During invocation of those endpoints, the full processing stack (input, output, and invocation context) is available, and the annotation-defined information is captured and stored once the endpoint invocation is completed.

DETAILED DESCRIPTION

Figure 1:
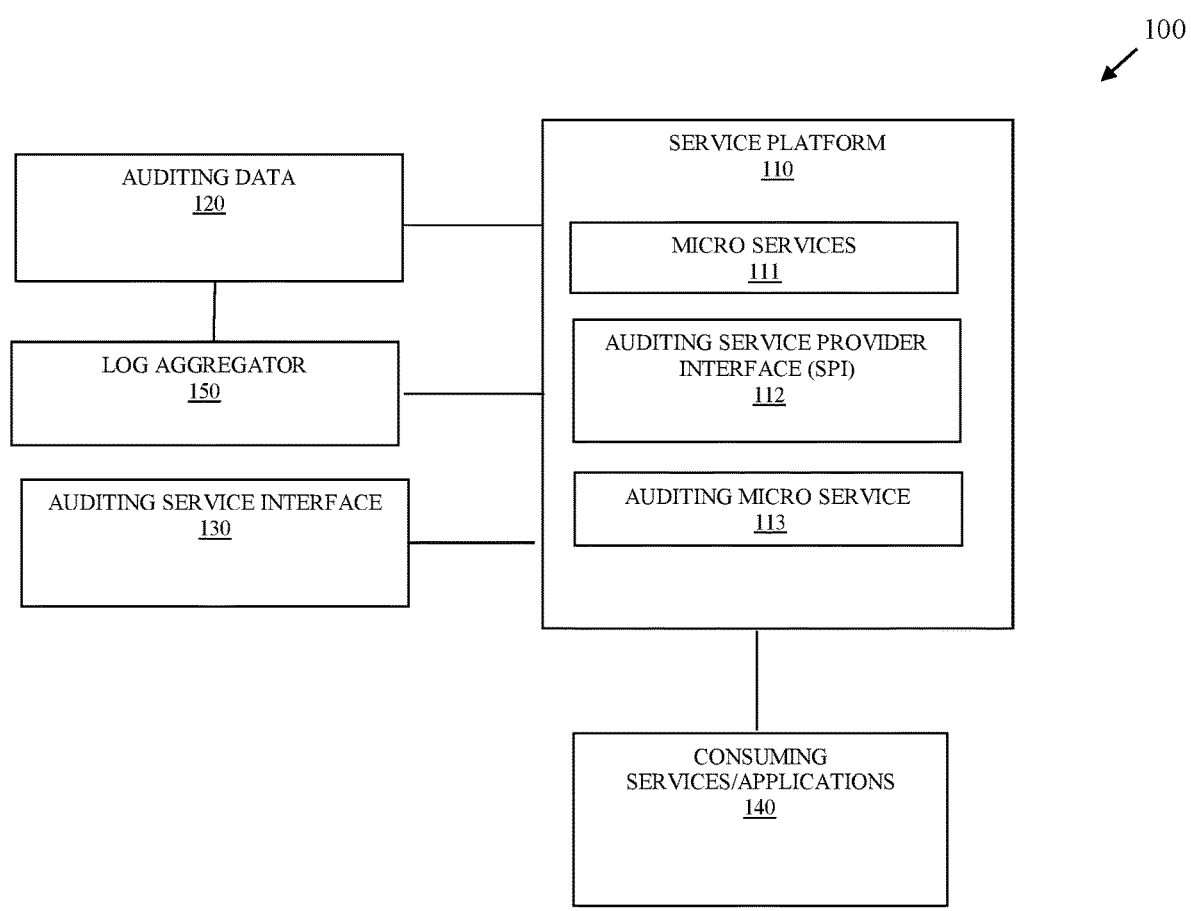
FIG. 1 is a diagram of a system for AaaS, according to an example embodiment.

FIG. 1 is a diagram of a system 100 for AaaS, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of AaaS, presented herein and below.

The system 100 includes Service Platform (SP) 110 that provides micro services 111 to a plurality of consuming services/applications 140 across a plurality of communication channels (mobile, web, text, email, social media, instant messages, Point-Of-Sale (POS) terminals, Self-Service Terminals (SSTs), Automated Teller Machines (ATMs), etc.). The system 100 further includes an auditing data store 120, an auditing service interface 110, and a log aggregator 150.

The SP 110 represents a plurality of servers having a plurality of hardware processors and non-transitory computer-readable storage media with executable instructions. The executable instructions when executed by the processors cause the processors to before the processing associated with the micro services 111, the auditing service provider interface (SPI) 112, and the auditing micro service 113.

The consuming services/applications 140 representing customizations utilizing the micro services 111 in different combinations and different processing sequences along with independent customized instructions. The consuming services/applications may execute on different servers or computers from that which is associated with the SP or can in some cases execute on a same server as one or more of the SP servers. The devices that execute the consuming services/applications 140 include processors and non-transitory computer-readable storage media having executable instructions representing the consuming services/applications 140. Those executable instructions when executed by the corresponding processors from the non-transitory computer-readable storage media cause the processors to perform the customized processing associated with the consuming services/applications 140.

The auditing service interface 110 is also represented as executable instructions that execute on hardware processors from non-transitory computer-readable storage media. The devices associated with the auditing service interface 110 may be the same as the devices of the SP 110 and/or the consuming services/applications 140 or the device or devices may be different from that which were associated with the SP 110 and/or the consuming services/applications 140.

Similarly, the log aggregator 150 is represented as executable instructions that execute on hardware processors from a non-transitory computer-readable storage media. The devices associated with the log aggregator 150 may be the same as the devices of the SP 110, the consuming services/applications 140, the auditing service interface 110, or the device or devices may be different devices.

The auditing data 120 may be stored in a plurality of distributed data stores (logically associated as a single data store) or a single data store. The auditing data store includes log data (may also be referred to as "audit data" herein) produced by the micro services 111 and processed by the auditing SPI 112 and the auditing service 113.

As used herein the micro services 111 and include, by way of example, a set of services used by the consuming services/applications 140 for: notification services, product catalogue services, transaction log services, customer data management services, promotion engine services, authentication services, security services, messaging services, data and event services, data replication services, data failover services, and others.

The auditing SPI 112 is an Application Programming Interface (API) that is invoked by the micro services 111 for purposes of capturing audit log data that would not ordinary be captured and logged by the services 111 and/or 140 and for purposes of maintaining a trace log during any transaction being processed by the consuming services/applications 140.

The micro services (MS) 111 are modified to make a call to the auditing SPI 112 upon being invoked. Alternatively, through programming aspect instrumentation, the processing environment for each MS 111 is linked to invoke the auditing SPI 112, such that no changes are needed to any of the source code of the MSs 111 beyond the metadata that defines the captured parameters.

The auditing SPI 112 provides a single method when invoked that captures auditing data for the invoking MS 111. The auditing SPI 112 is invoked within the processing context of the invoking MS 111 and as such has access at runtime to the processing stack associated with the invoking MS 111 and the context of the processing stack when the MS 111 was invoked.

The method of the auditing SPI 112 is designed to capture at least a minimal amount of information from the processing stack that is available but does not have to be used by the invoking MS 111. This audit information includes a context for which the invoking MS 111 was called and a context for the invoking MS 111 when processing exits or ends for that MS 111. By way of example, this audit information includes: metadata for the invoking application (this is the application that called the MS 111—not the MS 111 that invoked the auditing SPI 112), metadata for the invoked application (this is the invoking MS 111 that invokes the auditing SPI 112), the operation endpoint (this is the method or function that was invoked for the invoking MS 111), the operation result (data produced by the method or function of the MS 111—this can include a status), data for the invoking end user, data about the target resource (this is what if anything was created by the method of the MS 111), additional invocation metadata (time stamp, correlation identifier, originating host device identifier, etc.), classification data for the audit content, and/any ad-hoc user defined data (as discussed below). With the exception of the ad-hoc data, all the other audit data is available to the auditing SPI 112 from the processing stack associated with the invoking MS 111.

The auditing SPI 112 is invoked with data extracted using an annotation, the annotation is code added to the MS 111 that describes metadata to include with the automatically captured audit data for a given MS 111. The data extraction can use an expression language to format additional data to capture from the processing stack along with labels for that customized (ad-hoc) audit data. Additionally, the format and pre-captured audit data (as discussed above) can be changed with the annotation.

A given MS 111 does not require an annotation to invoke the auditing SPI 112, in such a case the captured data that is automatically acquired by the auditing SPI 112 is provided (assuming the given MS 111 used aspect instrumentation or used a line of code to invoke the auditing SPI 112).

Each MS 111 can customize the captured audit information that is captured by the auditing SPI 112 from the processing stack using its own customized annotation.

The auditing SPI 112 uses either a default action that is configurable to determined what to do when a given MS 111 invokes the auditing SPI 112 without a defined annotation. This default action can include capturing all the default audit data, use a default defined annotation, or do not capture any audit data at all.

The integration with the auditing SPI 112 produces the audit data for a given MS 111 and makes that audit data available as a data structure, such as a customized programming object. The given implementation of the processing environment for the MS 111 determines the location that the audit data defined by the object is sent to once the invoking MS 111 completes processing. The auditing SPI 112 implementation is managed through run-time linking.

The location can be to the auditing data store 120, to the auditing micro service 113, to a consuming service 140, to a dashboard (one instance of a specific consuming service/application 140), to a log associated with the invoking MS 111, to a user-defined custom location. Moreover, the implementation can dictate that the audit data (available in the object) be sent to multiple combinations of different locations.

The custom defining of the audit data collected provided by the auditing SPI 112 is decoupled from where the collected audit data is subsequent sent or consumed (the location(s)). This provides greater flexibility and allows for easier integration into the SP 110.

In an embodiment, when the audit data is linked in an implementation to be sent to the auditing MS 113, the auditing MS 113 indexes and stores the audit data in the auditing data store 120 and may also make the audit data available to a dashboard application 140 for real-time viewing by an administrator or support person. The auditing MS 113 also supports an auditing service interface 110. The auditing service interface 110 can be used by a front-end user interface to search and to generate reports from the auditing data store 120 through interaction with the auditing MS 113. The interface 130 may also support defining schedules or events for which the auditing MS 113 sends custom defined notifications or generates and sends custom defined reports.

The annotations can be customized to add labels or tags to captured audit data (either pre-provided or custom defined through the ad-hoc expression language statement). The tags can include any user defined key. For example, a user name may be defined in an annotation to be tagged as SENSITIVE. The auditing MS 113 may include rules that are based on tags that indicate if the end-user using interface 130 is searching the audit data store 120 all SENSITIVE tagged data is to be excluded from the search rules or returned with the search results with just the tag SENSITIVE. This can be completely customized by the organization associated with the consuming services/applications 140. Moreover, the customized tags can be set up through the interface 130 with the auditing MS 113 to generate events that then cause automated processing by the auditing MS 113 upon detection of the tag, sending the auditing data associated with the tag to a different consuming service/application 140 for automated processing.

Additionally, the annotations can be used to establish customized classifications for the audit data of a given organization. For example, any call made to a product catalogue MS 111 can include an annotation to classify method calls made to that MS 111 that generate a new catalogue entry with a NEW_ENTRY tag and to classify method calls made that MS 111 for deletion of a catalogue entry with DELETE_ENTRY tag. The end user can then perform searches on these categories through the interface 120 using the auditing MS 113. These classifications can be used to identify consumer loyalty levels, suppliers, and vendors by organizations as well. In fact, a wide variety of customized scenarios can exist through the organization-controlled category tagging through the annotations.

Moreover, an implementation or linked instance of a given MS 111 within a processing context for the consuming service/application 140 can dictate that each category custom labeled through the annotation be sent to a different destination resource/location. In this way, audit data that is less important may be sent to a storage area and the more important data directed to a dashboard 140 or some other user-defined resource/location.

An implementation may also be used to eliminate pre-captured information by the auditing SPI 112 and just retain defined audit information based on the defined tags in the annotation.

In an embodiment, a log aggregator 150 periodically processes the processing logs that are produced by the MS 111, indexes the aggregated log data, and stores that data in the auditing data store 120. In this way, the auditing micro service 113 has access to that data for supporting the features discussed above with respect to the interface 130. This embodiment may be used when linked implementations do not or did not send the auditing data captured in the auditing SPI 112 produced auditing object to the auditing MS 113 and such features are later desired by an organization.

One now appreciates how customized audit data can be captured through annotations provided to the auditing SPI 112 and how where that data is consumed, stored, and/or sent separately controlled through the linked implementation for any given MS 111. The customized audit data is indexed and accessible for automatic even processing, notification, dashboard display, querying, and reporting through the interface 130 and the auditing MS 113. Data not originally captured in the auditing data store 120 can be assembled, aggregated, indexed, and stored in the data store 120 through culling the individual MS 111 logs.

The system 100 provided AaaS by making auditing user-defined, customizable, and decoupled from the MS 111 from which auditing data is being captured through the annotations. Further, where the auditing data is consumed is decoupled from how it is captured. This makes auditing a service that is easily integrated into existing processing environments, such as the SP 110.

It is to be noted that the processing environments that implement the system 100 does not have to be an Omni Channel platform as illustrated and can be any processing environment that provides software services.

These and other embodiments are now discussed with reference to the FIGS. 2-4.

Figure 2:
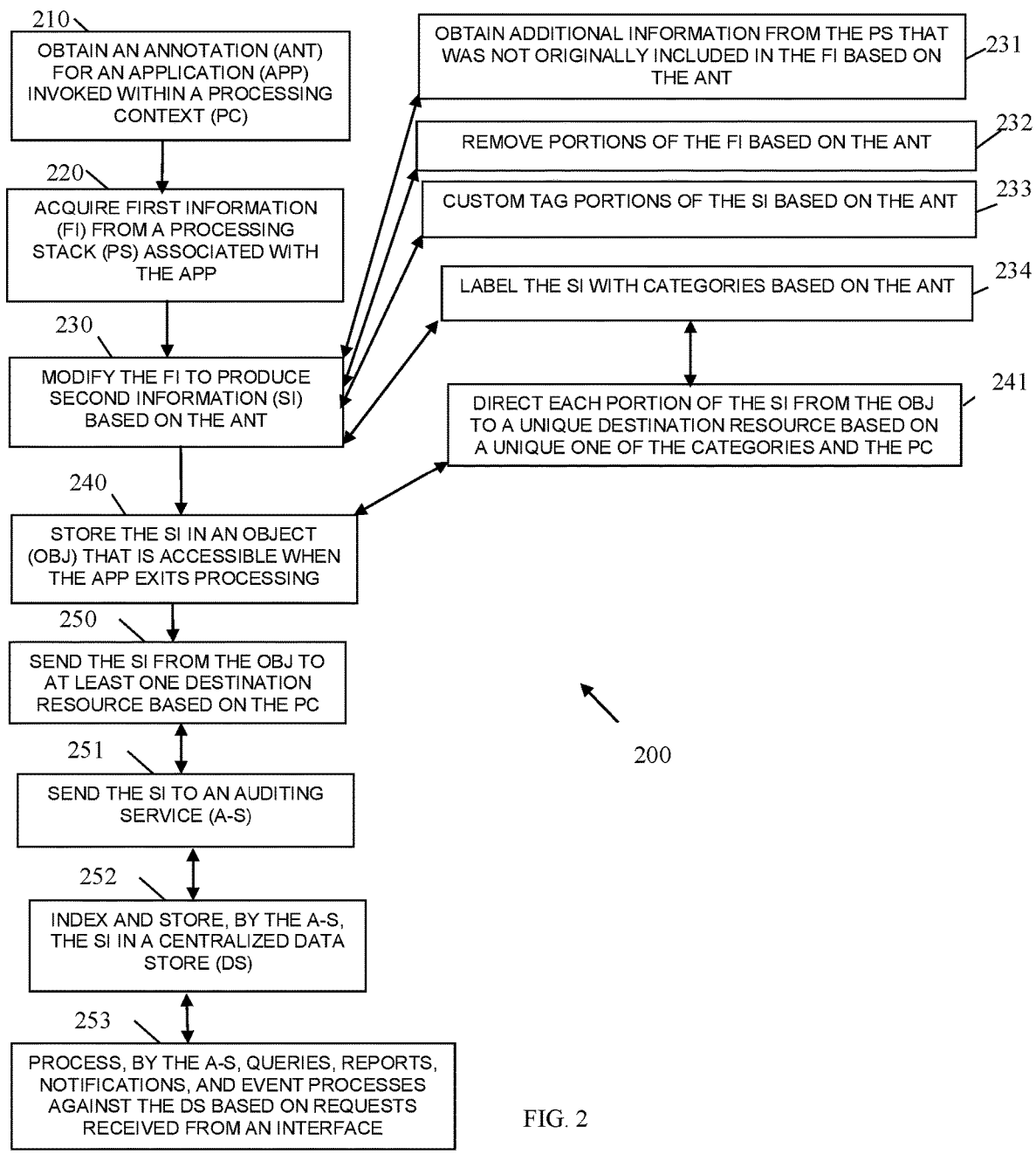
FIG. 2 is a diagram of a method for AaaS, according to an example embodiment.

FIG. 2 is a diagram of a method 200 for AaaS, according to an example embodiment. The software module(s) that implements the method 200 is referred to as an "auditing manager." The auditing manager is implemented as executable instructions programmed and residing within memory and/or a non-transitory computer-readable (processor-readable) storage medium and executed by one or more processors of a device. The processor(s) of the device that executes the auditing manager are specifically configured and programmed to process the auditing manager. The auditing manager has access to one or more network connections during its processing. The network connections can be wired, wireless, or a combination of wired and wireless.

In an embodiment, the device that executes the auditing manager is the server associated with the SP 110. In an embodiment, the server is a cloud-based server.

In an embodiment, the auditing manager is all or some combination of: the auditing service provider interface (SPI) 112, the auditing micro service 113, and/or the log aggregator 150.

At 210, the auditing manager is triggered by the presence of an annotation on the service endpoint of an application invoked within a processing context. The processing context includes the processing stack from a calling application that makes a call to the application. The application is a MS 111 as discussed above. The annotation defines the metadata referenced within the processing context when the application is invoked for audit capture within the processing context. This can be done through aspect instrumentation that causes the auditing manager to be invoked when the application is invoked, such that no changes are need to the source code associated with the application. The annotation specifies the types of auditing data to capture and includes any transformations on data that matches those invocations. Alternatively, the application MS 111 can make an explicit call to a linked implementation of the auditing SPI 112, although this may necessitate coding changes within the MS 111.

At 220, the auditing manager acquires first information from the processing stack associated with the application (including any input and output) as specified by the annotation. This can be the default captured processing stack information discussed above for the SPI 111.

At 230, the auditing manager modifies the information to produce second information based on the annotation. This can include any number of customized modifications as discussed above.

For example, and in an embodiment, at 231, the auditing manager obtains additional information from the processing stack that was not originally included in the default based on the annotation.

In another case, at 232, the auditing manager removes portion of the first information based on the annotation.

In yet another situation, at 233, the auditing manager custom tags portions of the second information based on the annotation.

In still another embodiment, at 234, the auditing manager labels the second information with categories based on the annotation.

It is to be noted that the embodiments 231-234 are not mutually exclusive, such that all of them can be present in a single embodiment or any combination of two or more of them can be present in a single embodiment.

At 240, the auditing manager stores the second information in a persistent object that survives and is retained in memory or storage when the application exits processing. So, the object is accessible when the application completes processing.

In an embodiment of 234 and 240, at 241, the auditing manager directs the second information from the object to a unique destination resource based on a unique one of the categories and the processing context. That is, the specific linked processing environment associated with the application determines a type or an attribute of the object that directs the object contents (second information) to be sent to a specific resource. In this embodiment, the categories are used to direct portions of the second information to different destination resources.

In an embodiment, at 250, the auditing manager sends the second information in the object to at least one destination resource based on the processing context within which the application was processed.

In an embodiment of 250, and at 251, the auditing manager sends the second information to an auditing micro service 113.

In an embodiment, at 252, the auditing micro service 113, indexes and stores the second information in a centralized data store 120.

In an embodiment, at 252, the auditing micro service 113, processes: queries, reports, notifications, and event processes against the data store 120 based on requests/conditions/definitions received from an interface 130.

Figure 3:
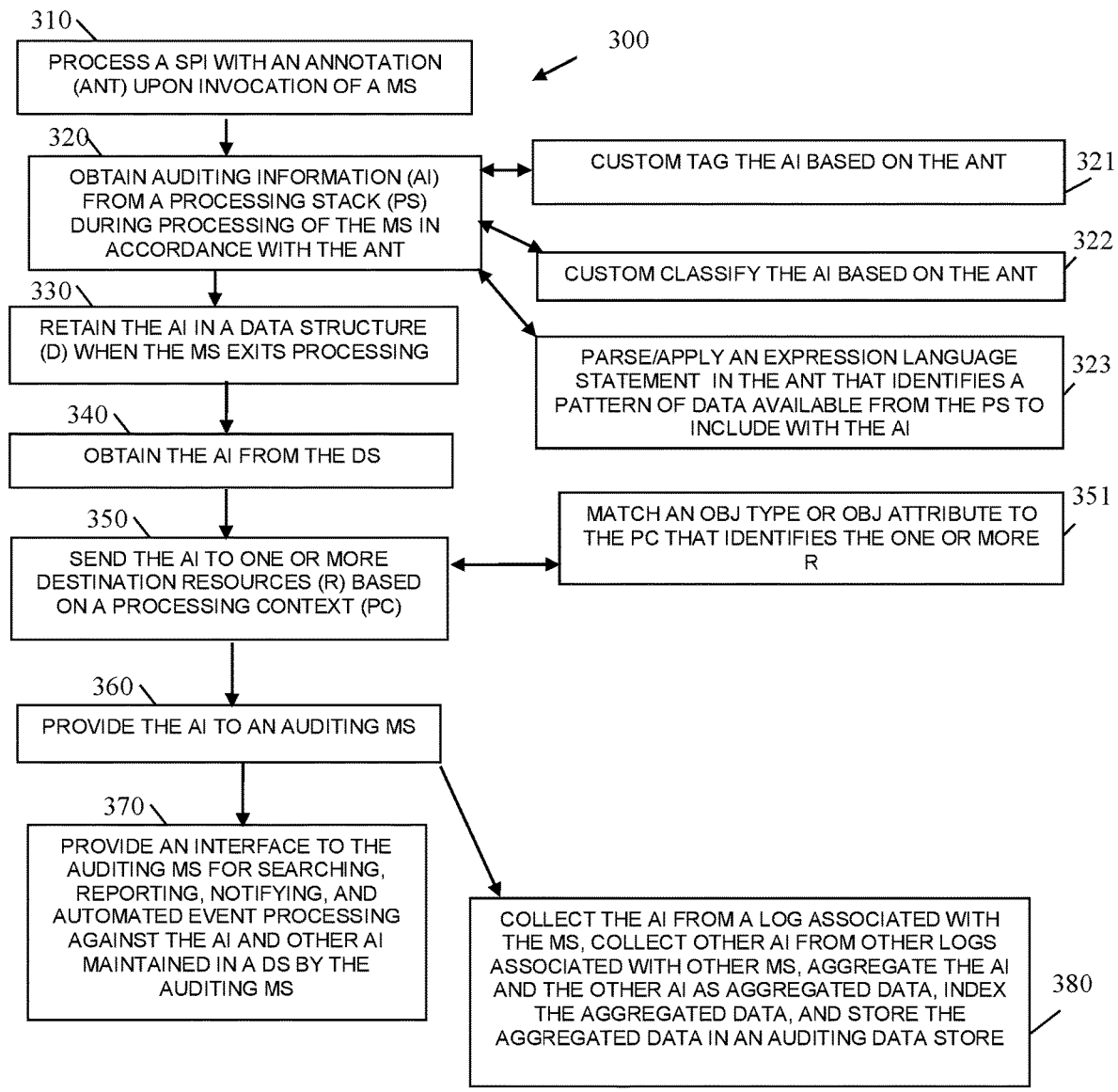
FIG. 3 is a diagram of another method for AaaS, according to an example embodiment.

FIG. 3 is a diagram of another method 300 for AaaS, according to an example embodiment. The software module(s) that implements the method 300 is referred to as an "audit data controller." The audit data controller is implemented as executable instructions programmed and residing within memory and/or a non-transitory computer-readable (processor-readable) storage medium and executed by one or more processors of a device. The processors that execute the audit data controller are specifically configured and programmed to process the audit data controller. The audit data controller has access to one or more network connections during its processing. The network connections can be wired, wireless, or a combination of wired and wireless.

In an embodiment, the device that executes the audit data controller is the server associated with the SP 110. In an embodiment, the server is a cloud processing environment.

In an embodiment, the audit data controller is all of or some combination of: the auditing SPI 112, the auditing MS 113, the auditing service interface 110, the log aggregator 150, and/or the method 200.

The audit data controller presents another and, in some ways, enhanced processing perspective of the method 200 discussed above.

At 310, the audit data controller processes a auditing SPI 112 with an annotation upon invocation of a MS 111. The annotation is a data structure or file customized for the MS 111 as was discussed at length herein and above.

At 320, the audit data controller obtains auditing information from a processing stack during processing of the MS 111 in accordance with the annotation.

In an embodiment, at 321, the audit data controller custom tags the auditing information based on the annotation constraints.

In an embodiment, at 323, the audit data controller custom classifies the auditing information based on the annotation.

In an embodiment, at 324, the audit data controller parses/applies an expression language statement in the annotation that identifies a pattern of data available from the processing stack to include with the auditing information.

Again, the embodiments 321-324 are not mutually exclusive, such that any given embodiment can include one or them, two of them, or all of them.

At 330, the audit data controller retains the auditing information within a persistent data structure when the MS 111 exits processing.

At 340, the audit data controller obtains the auditing information from the data structure.

At 350, the audit data controller sends the auditing information to one or more destination resources based on a processing context (the linked implementation environment from which the MS 111 was invoked).

In an embodiment, at 351, the audit data controller matches an object type or an object attribute to the processing context to identify the one or more destination resources. That is, an environmental variable may be set on the processing context that identifies the destination resources.

In an embodiment, at 360, the audit data controller provides the auditing information to an auditing MS 113.

In an embodiment, at 370, the audit data controller provides an interface 130 for searching, reporting, notifying, and automated event processing against the auditing information and other auditing information maintained in an auditing data store 120 by the auditing MS 113.

In an embodiment of 360 and at 380, the audit data controller collects the auditing information from an auditing log associated with the MS 111, collects other auditing information from other logs associated with other MSs 111, aggregates the auditing information and the other auditing information as aggregated data, indexes the aggregated data, and stores the indexed and aggregated data in an auditing data store 120. In an embodiment, the processing at 380 is performed by the log aggregator 150.

Figure 4:
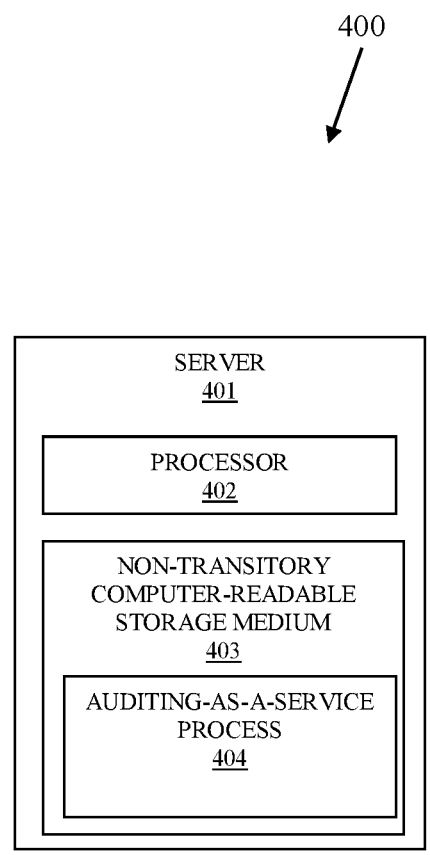
FIG. 4 is a diagram of another system for AaaS, according to an example embodiment.

FIG. 4 is a diagram of a system 400 for AaaS, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 includes a plurality of a server 401. The server 401 includes at least one hardware processor 402 and configured to execute executable instructions from a non-transitory computer-readable storage medium 403 as AaaS process 404.

The AaaS process 404 when executed from the non-transitory computer-readable storage medium 403 on the processor 402 is configured to cause the processor to: 1) obtain pre-defined audit information from a processing stack upon invocation of an application for processing within a processing context; 2) modify the pre-defined audit information based on an annotation associated with the application to produce modified audit information; 3) store the modified audit information in an object that is accessible when the application exits processing; and 4) direct the modified audit information to a destination associated with the processing context.

In an embodiment the AaaS 404 is all of or is some combination of: the auditing SPI 112, the auditing MS 113, the auditing service interface 110, the log aggregator 150, the method 200, and/or the method 300.

In an embodiment the application is one of the consuming services/applications 140.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    obtaining an annotation for an application invoked within a processing context;
    acquiring first information associated with auditing data from a processing stack that is associated with the application by obtaining first types of auditing data as defined in the annotation, wherein the first types of auditing data are associated with a first type of data, wherein the first type of data at least comprises a function name processed by the application, a calling application name for a calling application that called the application, an operation result provided by a function associated with the function name, originating host identifier for a host device, and classification data for the audit data;
    adding a customized tag to the first information based on an expression language statement processed against the first information by parsing or applying the expression language statement defined in the annotation to identify a pattern of data available from the processing stack and including with the auditing data, wherein the expression language statement is defined by a user;
    modifying the first information to produce second information by processing transformations defined in the annotation, wherein processing the transformation further includes formatting second information based on a data format defined in the annotation; and
    storing the second information in an object that is accessible when the application exits processing.

2. The method of claim 1 further comprising, sending the second information from the object to at least one destination resource based on the processing context.

3. The method of claim 2, wherein sending further includes sending the second information to an auditing service.

4. The method of claim 3, wherein sending further includes indexing and storing, by the auditing service the second information in a centralized data store.

5. The method of claim 4, wherein indexing and storing, further includes processing, by the auditing service, queries, reports, notifications, and event processes against the centralized data store based on requests received from an auditing interface.

6. The method of claim 1, wherein modifying further includes obtaining additional information from the processing stack that was not originally included in the first information based on the annotation.

7. The method of claim 1, wherein modifying further includes removing portions of the first information based on the annotation.

8. The method of claim 1, wherein modifying further includes custom tagging portions of the second information based on the annotation.

9. The method of claim 1, wherein modifying further includes labeling the second information with categories based on the annotation.

10. The method of claim 9, wherein storing further includes directing each portion of the second information from the object to a unique destination resource based on a unique one of the categories and the processing context.

11. A method, comprising:
    process a service provider interface with an annotation upon invocation of a micro service;
    obtaining auditing information from a processing stack during the processing of the micro service based on types of auditing information defined in the annotation, wherein a first type of data at least comprises a function name processed by the micro service, a calling application name for a calling application that called the micro service, an operation result provided by a function associated with the function name, originating host identifier for a host device, and classification data for the audit information;
    adding a customized tag to the auditing information based on an expression language statement processed against the auditing information by parsing or applying the expression language statement defined in the annotation to identify a pattern of data available from the processing stack and including with the auditing information, wherein the expression language statement is defined by a user;
    processing transformations defined in the annotation on the auditing information to transform the auditing information;
    retaining the auditing information that is transformed in a data structure when the micro service exits processing;
    obtaining the auditing information from the data structure; and
    sending the auditing information to one or more destination resources based on a processing context.

12. The method of claim 11 further comprising, provide the auditing information to an auditing micro service.

13. The method of claim 12 further comprising, providing an interface to the auditing micro service for searching, reporting, notifying, and automated event processing against the auditing information and other auditing information maintained in a data store by the auditing micro service.

14. The method of claim 11 further comprising, collecting the auditing information from a log associated with the micro service, collecting other auditing data from logs associated with other micro services, aggregating the auditing information with the other auditing information as aggregated data, indexing the aggregated data, and storing in an auditing data store.

15. The method of claim 11, wherein obtaining further includes custom tagging the auditing information based on the annotation.

16. The method of claim 11, wherein obtaining further includes custom classifying the auditing information based on the classification data of the annotation.

17. The method of claim 11, wherein sending further includes matching an object type or object attribute to the processing context that identifies the one or more destination resources.

18. A system, comprising:
- a server that includes a processor and a non-transitory computer-readable storage medium having executable instructions;
- the executable instructions when executed by the processor from the non-transitory computer-readable storage medium cause the processor to:

obtain pre-defined audit information from a processing stack upon invocation of an application for processing within a processing context, wherein types of pre-defined audit information is obtained from an annotation associated with the application, wherein a first type of data at least comprises a function name processed by the application, a calling application name for a calling application that called the application, an operation result provided by a function associated with the function name, originating host identifier for a host device, and classification data for the pre-defined audit information;

add a customized tag to the pre-defined audit information based on an expression language statement processed against the pre-defined audit information by parsing or applying the expression language statement defined in the annotation to identify a pattern of data available from the processing stack and including with the pre-defined audit information, wherein the expression language statement is defined by a user;

modify the pre-defined audit information by processing transformations defined in the annotation to produce modified audit information;

store the modified audit information in an object that is accessible when the application exits processing; and direct the modified audit information to a destination associated with the processing context.

19. The system of claim 18, wherein the executable instructions are provided as an Auditing-as-a-Service (AaaS) process from a cloud processing environment.

* * * * *

UNITED STATES PATENT AND TRADEMARK OFFICE
CERTIFICATE OF CORRECTION

PATENT NO. : 11,531,611 B2  
APPLICATION NO. : 16/524511  
DATED : December 20, 2022  
INVENTOR(S) : Michael Schechter Page 1 of 1

It is certified that error appears in the above-identified patent and that said Letters Patent is hereby corrected as shown below:

On the Title Page

Item [57], in Column 2, Line 4, delete "audition information" and insert --auditing information-- therefor Signed and Sealed this  
Eighteenth Day of March, 2025

Coke Morgan Stewart  
*Acting Director of the United States Patent and Trademark Office*